United States Patent
In et al.

(10) Patent No.: US 10,578,903 B2
(45) Date of Patent: *Mar. 3, 2020

(54) DISPLAY APPARATUS

(71) Applicant: SAMSUNG ELECTRONICS CO., LTD., Suwon-si (KR)

(72) Inventors: Woo Sung In, Hwaseong-si (KR); Sung Soo Jung, Suwon-si (KR); Hyun Jun Jung, Yongin-si (KR); Jong Hee Han, Yongin-si (KR); Kwang Hyuck So, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,149

(22) Filed: Oct. 17, 2018

(65) Prior Publication Data
US 2019/0049774 A1    Feb. 14, 2019

Related U.S. Application Data

(63) Continuation of application No. 15/710,226, filed on Sep. 20, 2017.

(30) Foreign Application Priority Data

Sep. 20, 2017    (KR) .......... 10-2016-0128938

(51) Int. Cl.
G02F 1/1333    (2006.01)
F16M 11/10    (2006.01)
(Continued)

(52) U.S. Cl.
CPC ....... *G02F 1/133308* (2013.01); *F16M 11/00* (2013.01); *F16M 11/04* (2013.01);
(Continued)

(58) Field of Classification Search
CPC .. G02F 1/133308; F16M 11/00; F16M 11/04; F16M 11/041; F16M 11/06; F16M 11/10; F16M 13/02
See application file for complete search history.

(56) References Cited

U.S. PATENT DOCUMENTS 6,229,584 B1 *    5/2001    Chuo ............... G06F 1/1601
                                                         248/917
6,378,830 B1 *    4/2002    Lu .................. F16M 11/10
                                                         16/337
(Continued)

FOREIGN PATENT DOCUMENTS

DE    20 2009 014 369 U1    3/2011
KR    10-2004-0021741 A    3/2004
(Continued)

OTHER PUBLICATIONS

Communication dated Feb. 13, 2019, issued by the European Patent Office in counterpart European Application No. 18201629.5.
(Continued)

Primary Examiner — Nidhi Thaker
(74) Attorney, Agent, or Firm — Sughrue Mion, PLLC

(57) ABSTRACT

A display apparatus includes a display; a fixing bracket configured to be fixed to a wall; and a wall mount coupled to the fixing bracket, the wall mount being configured support the display, to be set in a close contact mode in which the wall mount is adjacent to the wall, and to be set a tilting mode in which the wall mount is tilted with respect to the wall. The display includes: a first accommodating portion recessed in a rear surface of the display and configured to accommodate the wall mount and the fixing bracket; and a wall mount coupling part provided within the first accommodating part and configured to be coupled to the wall mount. The rear surface of the display is brought into
(Continued)

close contact with the wall when the wall mount is set to the close contact mode.

7 Claims, 13 Drawing Sheets

(51) Int. Cl.
*G06F 1/16* (2006.01)
*F16M 11/06* (2006.01)
*F16M 11/00* (2006.01)
*F16M 11/04* (2006.01)
*F16M 13/02* (2006.01)

(52) U.S. Cl.
CPC ........... *F16M 11/041* (2013.01); *F16M 11/06* (2013.01); *F16M 11/10* (2013.01); *F16M 13/02* (2013.01); *G06F 1/1601* (2013.01)

(56) References Cited

U.S. PATENT DOCUMENTS

| | | | | |
|---|---|---|---|---|
| 6,402,109 | B1* | 6/2002 | Dittmer | F16M 11/10 |
| | | | | 248/279.1 |
| 6,522,530 | B2* | 2/2003 | Bang | G06F 1/16 |
| | | | | 16/367 |
| 6,796,541 | B2* | 9/2004 | Lu | E05D 11/087 |
| | | | | 16/340 |
| 6,837,469 | B2* | 1/2005 | Wu | F16M 11/126 |
| | | | | 248/278.1 |
| 8,333,355 | B2* | 12/2012 | Stifal | F16M 11/10 |
| | | | | 248/279.1 |
| 8,684,325 | B1 | 4/2014 | Beshara | |
| 2007/0023599 | A1* | 2/2007 | Fedewa | F16M 11/10 |
| | | | | 248/284.1 |
| 2010/0051775 | A1 | 3/2010 | Wu et al. | |
| 2011/0050590 | A1* | 3/2011 | Viglione | F16M 11/10 |
| | | | | 345/173 |

FOREIGN PATENT DOCUMENTS

| | | |
|---|---|---|
| KR | 10-2013-0012270 A | 2/2013 |
| WO | 2009054645 A1 | 4/2009 |
| WO | 2011/142502 A1 | 11/2011 |

OTHER PUBLICATIONS

Communication dated Feb. 16, 2018 issued by the European Patent Office in counterpart European Patent Application No. 17191142.3.
Communication dated Aug. 7, 2018, from the European Patent Office in counterpart European Patent Application No. 17191142.3.
Communication dated Oct. 1, 2019 issued by the European Patent Office in counterpart European Application No. 18 201 629.5.

* cited by examiner

DISPLAY APPARATUS

CROSS-REFERENCE TO RELATED APPLICATION

This is a continuation of U.S. application Ser. No. 15/710,226 filed on Sep. 20, 2017, which claims priority from Korean Patent Application No. 10-2016-0128938, filed on Oct. 6, 2016 in the Korean Intellectual Property Office, the disclosures of which are incorporated herein by reference.

BACKGROUND

1. Field

Example embodiments of the present disclosure relate to a display apparatus, and more particularly, to a display apparatus provided to come into close contact with a wall surface.

2. Description of the Related Art

Recently, in a display apparatus, a display to display contents is providing higher resolution and becoming larger in size. The display is becoming thinner and lighter in weight. In addition, the display is often fixed to a wall.

The display apparatus includes a wall mount to fix the display to the wall. When the display is fixed to the wall using the wall mount, the display is spaced apart from the wall by a distance corresponding to a thickness of the wall mount.

As the display is spaced apart from the wall, the related are display apparatus may not give the user the impression that the display is integrated with the wall and is not ideal in appearance because the rear surface of the display is exposed to the user through the upper, lower, left, and right sides of the display.

In the related art, the above problems may be addressed through methods of using the surrounding environment, such installing a display by depressing a wall, covering a display with a separate cover, and the like.

SUMMARY

One or more example embodiments provide a display apparatus capable of bringing a display into close contact with a wall.

One or more example embodiments also provide a display apparatus capable of stably holding and easily separating a display on or from a wall.

According to an aspect of an example embodiment, there is provided a display apparatus including: a display; a fixing bracket configured to be fixed to a wall; and a wall mount coupled to the fixing bracket, the wall mount being configured support the display, to be set in a close contact mode in which the wall mount is adjacent to the wall, and to be set a tilting mode in which the wall mount is tilted with respect to the wall, wherein the display includes: a first accommodating portion recessed in a rear surface of the display and configured to accommodate the wall mount and the fixing bracket; and a wall mount coupling part provided within the first accommodating portion and configured to be coupled to the wall mount, and wherein the rear surface of the display is brought into close contact with the wall when the wall mount is set to the close contact mode.

The first accommodating portion may have a depth corresponding to a sum of a thickness of the fixing bracket and a thickness of the wall mount.

The first accommodating portion may have a shape corresponding to a shape of the wall mount and the fixing bracket coupled together.

The display may further include a first accommodating portion cover configured to cover the first accommodating portion when the display is detached from the wall mount.

The wall mount may include a coupling protrusion configured to be coupled to the wall mount coupling part to support the display.

The display may further include a second accommodating portion recessed at one side end portion of the rear surface of the display and configured to accommodate a cable connected to an external device, and the second accommodating portion may include a cable guiding portion configured to guide the cable to be drawn out of the display through one side surface of the display.

The second accommodating portion may have a minimum depth corresponding to the thickness of the cable.

The display may further include a second accommodating portion cover configured to cover the second accommodating portion.

The wall mount may include: a first member including a shaft detachably coupled to the fixing bracket; a tilting member including a first rotating portion rotatably coupled to the first member; and a second member including a second rotating portion rotatably coupled to the first member and a guide slit configured to guide movement of one end portion of the tilting member.

The tilting member may further include a guide protrusion accommodated in the guide slit, and the guide slit may be further configured to guide movement of guide protrusion.

The guide slit may be slidably or rollably coupled to the guide slit.

The fixing bracket may include a shaft coupling portion to which the shaft is coupled, and the shaft coupling portion may include a safety device configured to selectively secure the shaft such that the shaft is selectively detached from the shaft coupling portion.

The shaft may include: a fixing portion pressed by the safety device so that the wall mount is fixed to the fixing bracket when the wall mount is coupled with the fixing bracket; and a pressing portion configured to press the safety device so that fixing of the safety device to the shaft is released when the wall mount is detached from the fixing bracket.

The wall mount may be configured to be released from the safety device as the shaft rotates.

The first member may include a rotating protrusion rotatably coupled to the second rotating portion, and the rotating protrusion may be coupled to the second rotating portion to be rotatable with respect to the second member when a force is applied to the second rotating portion.

According to an aspect of another example embodiment, there is provided a display apparatus including: a display; a fixing bracket configured to be fixed to a wall; and a wall mount coupled to the fixing bracket, the wall mount being configured to support the display, to be set in a close contact mode in which the wall mount is adjacent to the wall, and to be set in a tilting mode in which the wall mount is tilted with respect to the wall, wherein the display includes a first accommodating portion recessed in a rear surface of the display and configured to accommodate the wall mount and the fixing bracket, and wherein the first accommodating portion has a depth corresponding to a sum of a thickness of the fixing bracket and a thickness of the wall mount.

The first accommodating portion may have a shape corresponding to a shape of the wall mount and the fixing bracket coupled together.

The display may further include a second accommodating portion recessed at a lower end portion of the rear surface of the display and configured to accommodate a cable connected to an external device.

According to an aspect of another example embodiment, there is provided a display apparatus including: a display; a fixing bracket configured to be fixed to a wall; and a wall mount coupled to the fixing bracket and configured to support the display, wherein the display includes a first accommodating portion recessed in a rear surface of the display and configured to accommodate the wall mount and the fixing bracket, and wherein the wall mount includes: a first member detachably coupled to the fixing bracket; a tilting member rotatably coupled to the first member; and a second member rotatably coupled to the first member and including a guide slit configured to guide movement of an end portion of the tilting member.

The wall mount may be configured to be detachable from the fixing bracket by rotating the first member relative to the fixing bracket.

BRIEF DESCRIPTION OF THE DRAWINGS

The above and/or other aspects will become apparent and more readily appreciated from the following description of example embodiments, taken in conjunction with the accompanying drawings of which.

DETAILED DESCRIPTION

Figure 1:
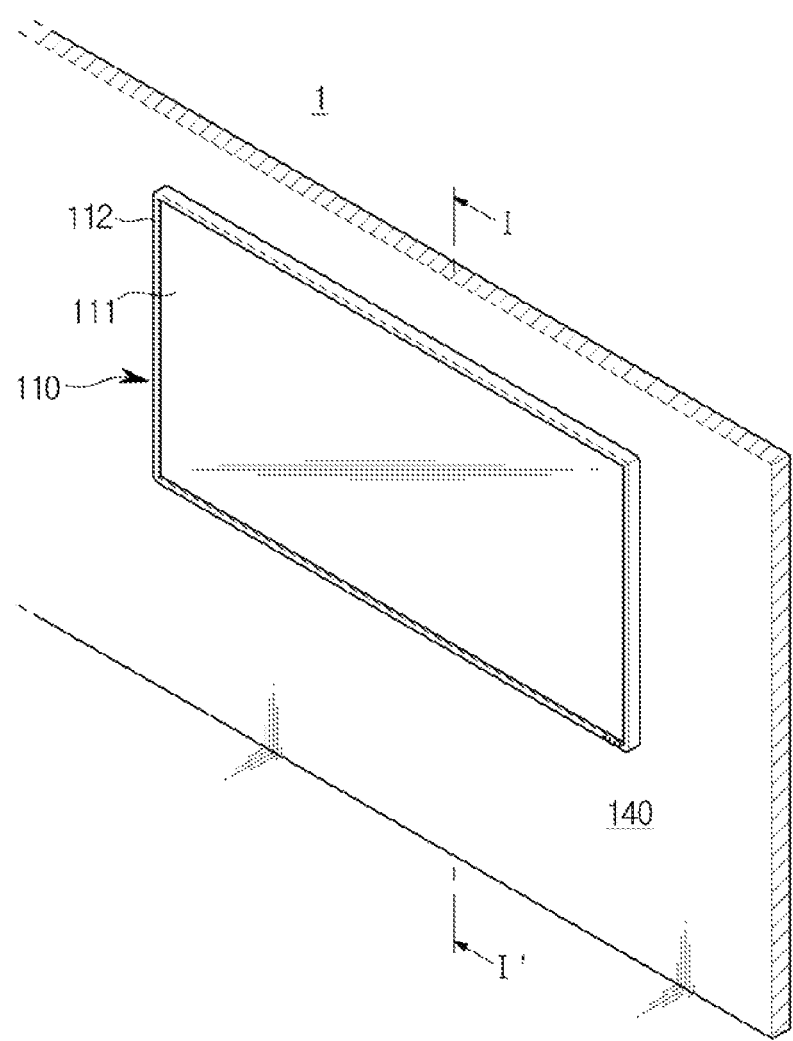
FIG. 1 is a perspective view illustrating a state where a display of a display apparatus according to an example embodiment is fixed to a wall.

Configurations illustrated in embodiments and the drawings described in the present specification are only examples, and thus it is to be understood that various modified examples, which may replace the embodiments and the drawings described in the present specification, are possible.

Also, like reference numerals or symbols provided in the drawings of the present specification represent members or components that perform the substantially same functions.

The terms used in the present specification are used to describe example embodiments. Accordingly, it should be apparent to those skilled in the art that the following description of example embodiments is provided for illustration purpose only and not for the purpose of limiting the present disclosure as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, operations, components, or combination thereof, but do not preclude the presence or addition of one or more other features, figures, steps, components, members, or combinations thereof.

The content may be displayed in a display apparatus. For example, the content may include a video file or an audio file played in a video player as one of applications, a music file played in a music player, a photo file displayed in a photo gallery, a web page file displayed in a web browser, and the like. The content may include broadcasts received.

The content may include a video file, an audio file, a text file, an image file, or a web page displayed or executed in an application. The content may include video files and/or audio files included in the received broadcast signal.

In an example embodiment, content received externally or stored content may include a broadcast signal, a video file, an audio file, a text file, an image file, or a web page that is executed in response to a user input (e.g. a touch, etc.). The term 'video' may be used in the same sense as a moving image.

The content may include an application screen to be executed and a user interface constituting an application screen. The content may include one content or a plurality of contents.

An application refers to software used by a user running on a desk-top Operating system (OS), a mobile OS, or a display apparatus OS. For example, the application may include a word processor, a spreadsheet, a contacts application, a calendar application, a memo application, an alarm application, a social network system (SNS) application, a chatting application, a map application, a music player, or a video player. An application according to an example embodiment may mean software executable in a display apparatus corresponding to a received user input. An application according to an example embodiment may be downloaded from outside of the display apparatus to represent software executable in a display apparatus.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, the example embodiments will be described in detail with reference to the accompanying drawings in detail.

Figure 2:
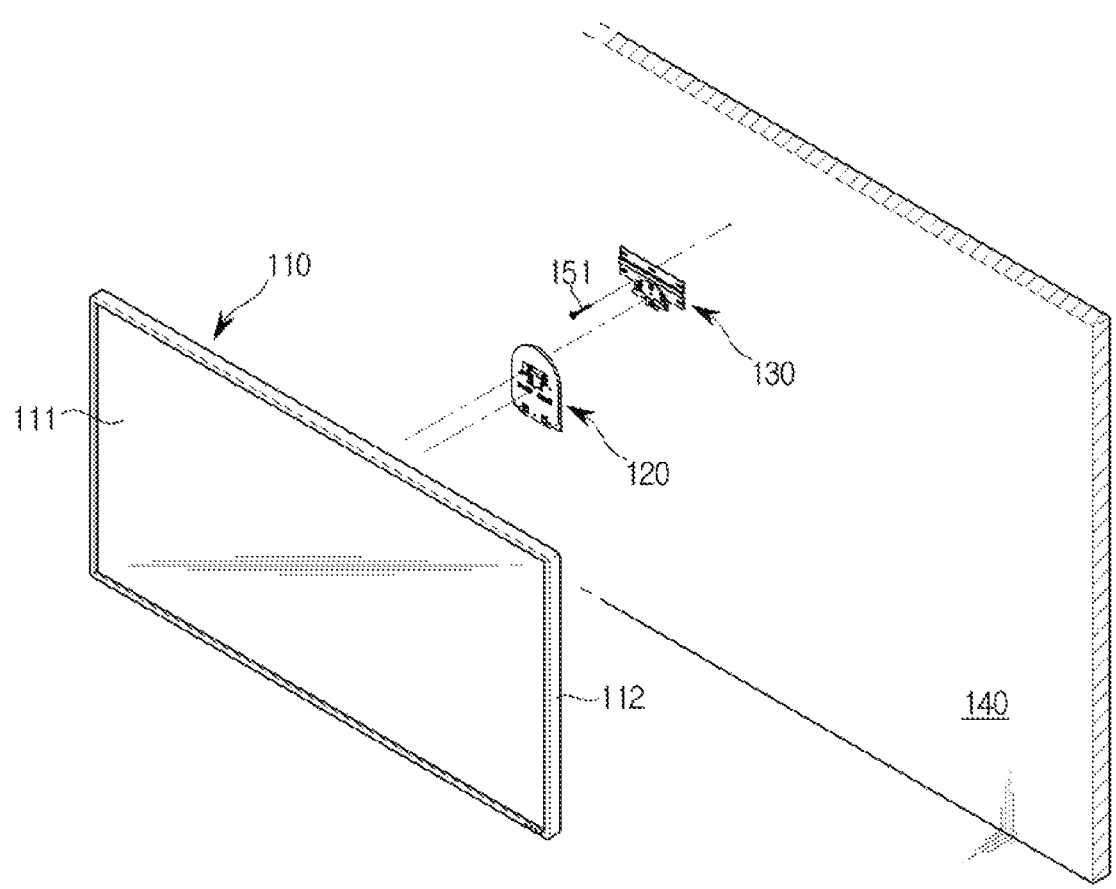
FIG. 2 is an exploded perspective view illustrating the display apparatus shown in FIG. 1 according to an example embodiment.

FIG. 1 is a perspective view illustrating a state where a display of a display apparatus according to an example embodiment is fixed to a wall. FIG. 2 is an exploded perspective view illustrating the display apparatus shown in FIG. 1.

Referring to FIGS. 1 and 2, a display apparatus 1 according to an example embodiment will be described. Hereinafter, the display apparatus 1 will be described as including a display 110, a wall mount 120, and a fixing bracket 130.

The display apparatus 1 may include a display 110 to display the content, a wall mount 120 to fix the display 110 to a wall 140, and a fixing bracket 130. It will be understood that the components included in the display apparatus 1 can be changed in response to the slimming of the display apparatus 1.

The display 110 may include a display panel 111 on which content is displayed, and a side frame 112 that supports at least a portion of a side portion of the display panel 111. The display 110 is an output to output visual and/or audible contents, and may include a liquid crystal display (LCD) panel, a light emitting diode (LED) panel or an organic LED panel. This display 110 may be installed on the wall 140 by a wall mount 120 due to its thin thickness.

Figure 3:
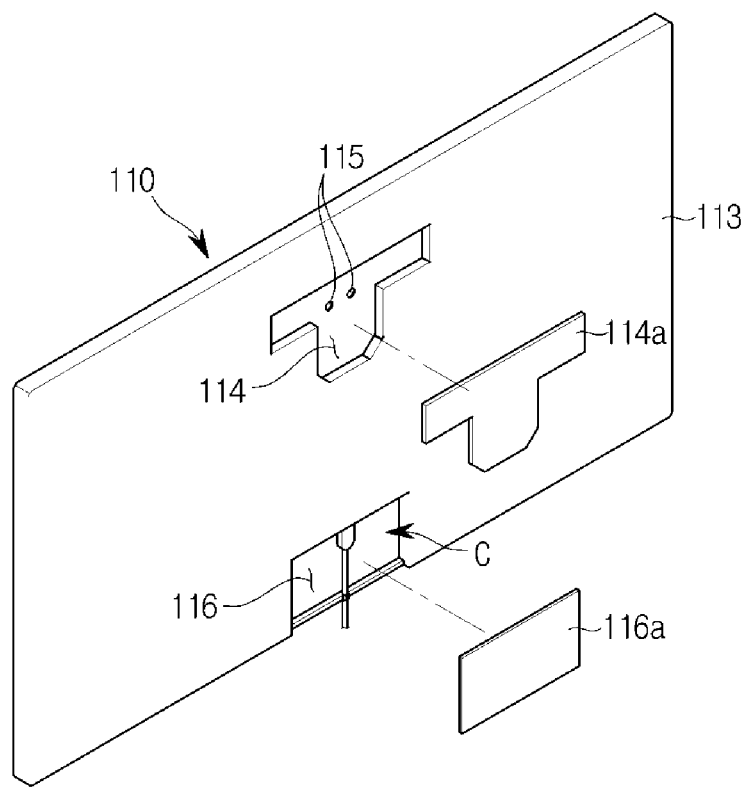
FIG. 3 is a perspective view illustrating a rear surface of the display shown in FIG. 1 according to an example embodiment.
Figure 4:
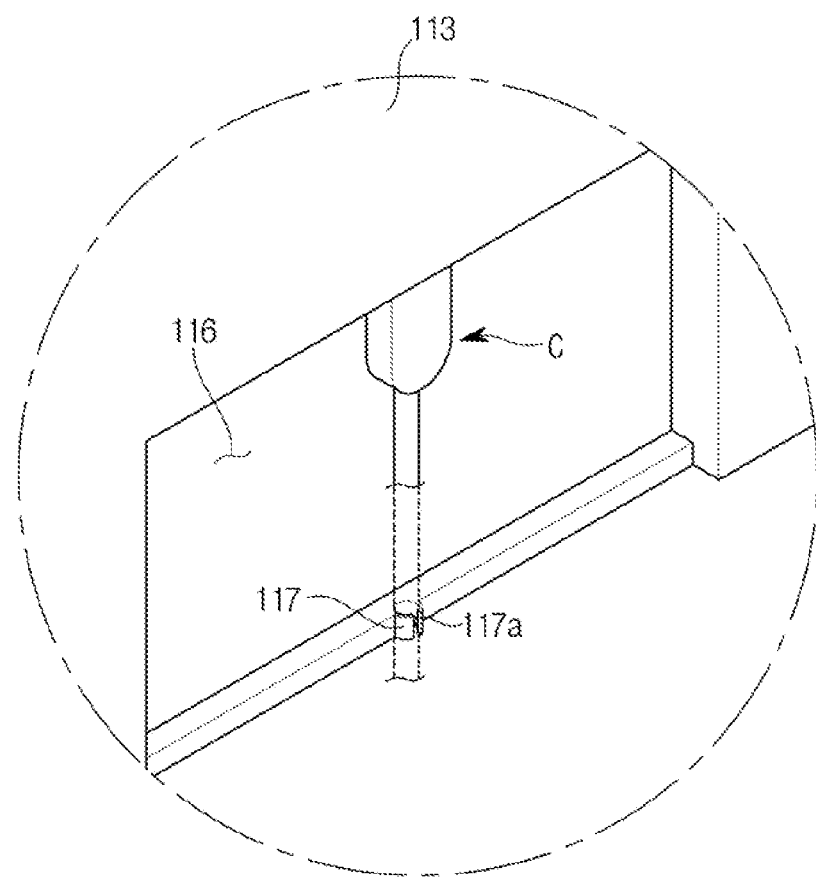
FIG. 4 is an enlarged view of a second accommodating portion shown in FIG. 3.
Figure 5:
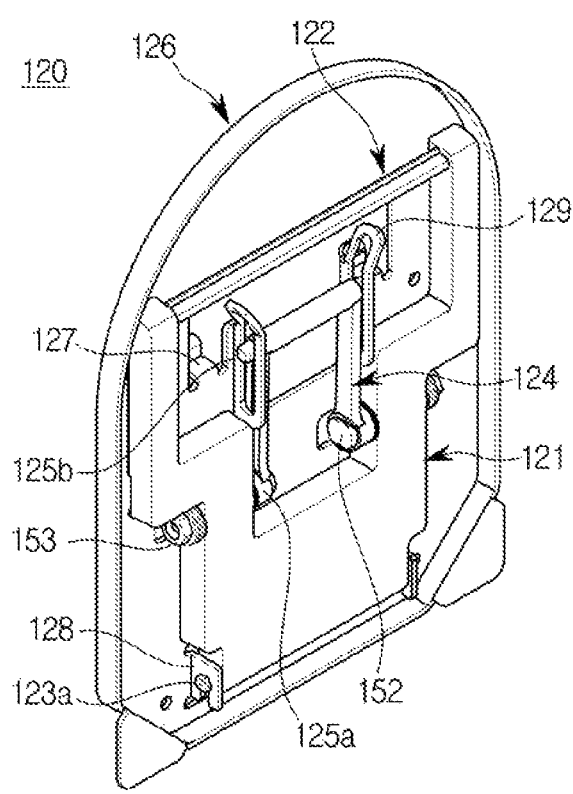
FIG. 5 is a perspective view from the rear of the wall mount shown in FIG. 2 according to an example embodiment.
Figure 6:
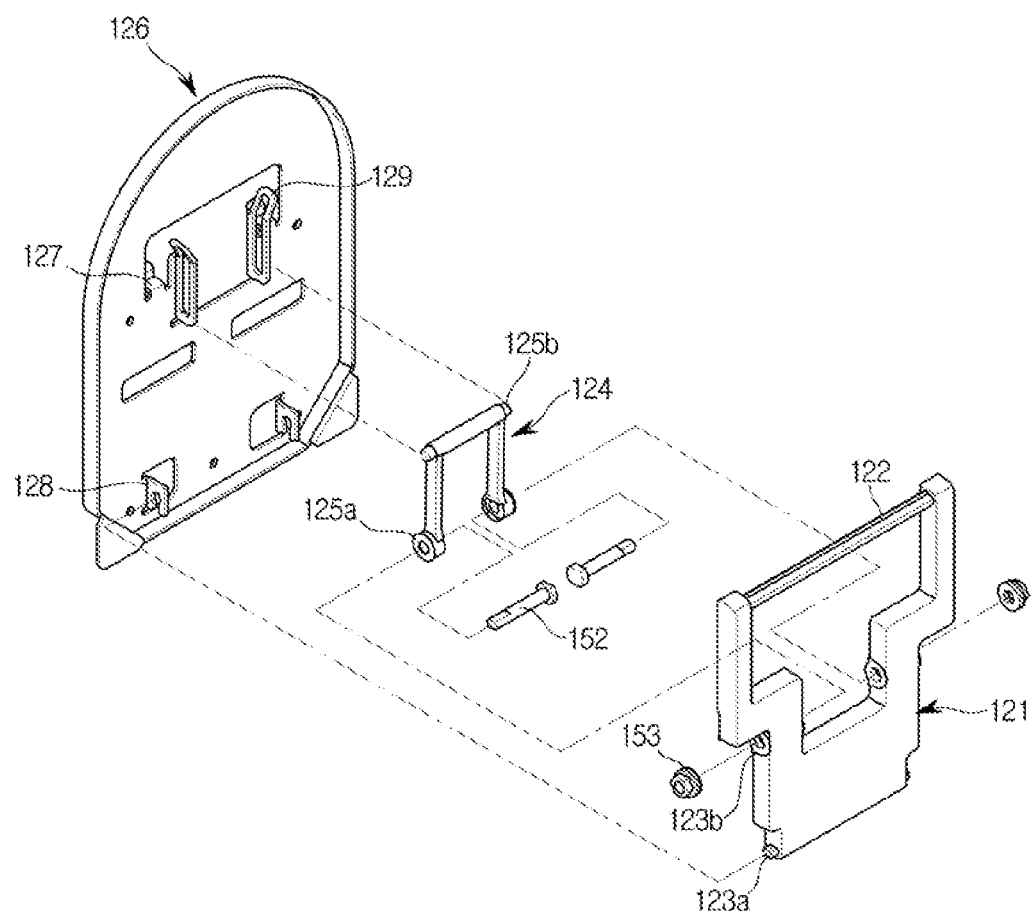
FIG. 6 is an exploded perspective view illustrating the wall mount shown in FIG. 5.
Figure 7:
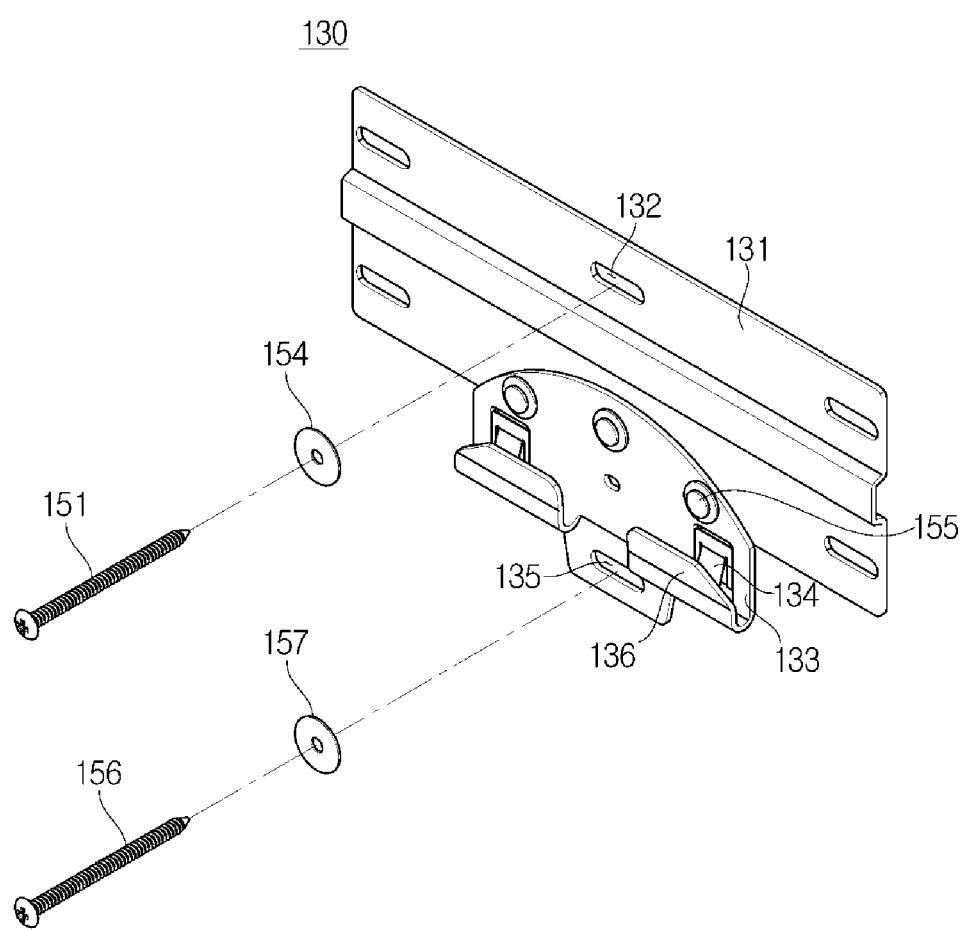
FIG. 7 is a perspective view illustrating a fixing bracket shown in FIG. 2 according to an example embodiment.
Figure 8:
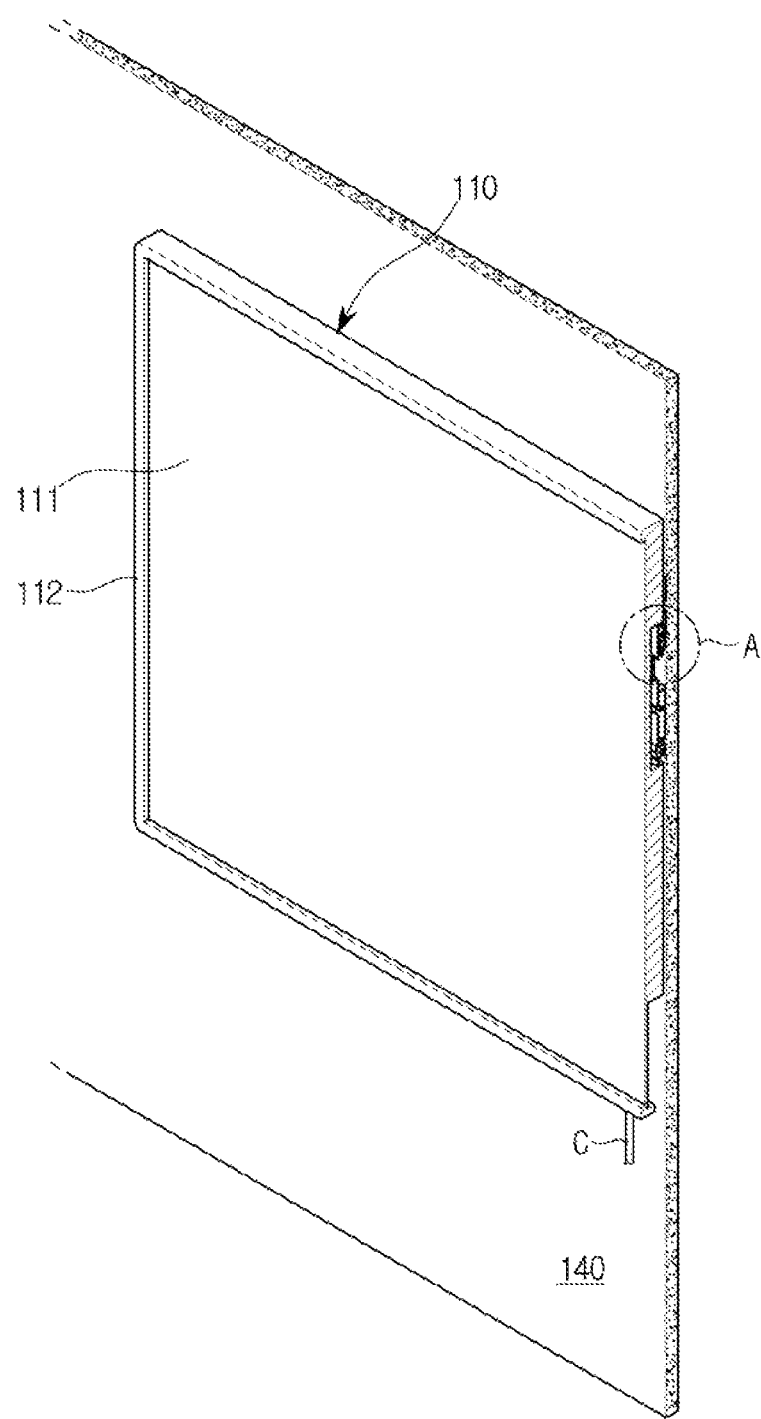
FIG. 8 is a cross-sectional perspective view taken along line I-I' shown in FIG. 1.
Figure 9:
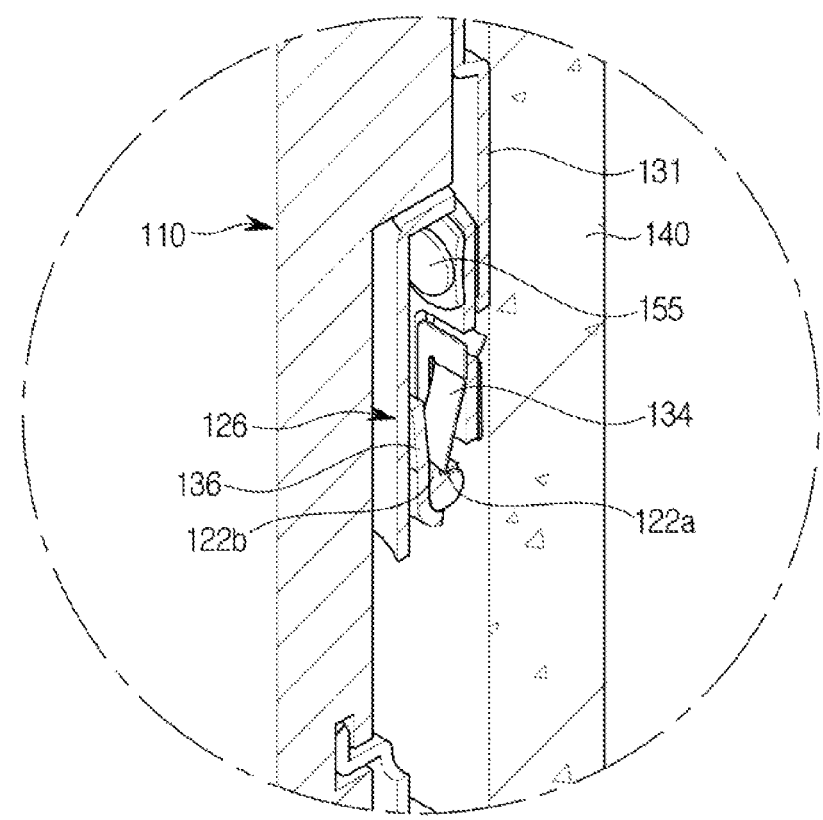
FIG. 9 is an enlarged view illustrating A portion shown in FIG. 8.

FIG. 3 is a perspective view illustrating a rear surface of the display shown in FIG. 1. FIG. 4 is an enlarged view of a second accommodating portion shown in FIG. 3. FIG. 5 is a perspective view from the rear of the wall mount shown in FIG. 2. FIG. 6 is an exploded perspective view illustrating the wall mount shown in FIG. 5. FIG. 7 is a perspective view illustrating a fixing bracket shown in FIG. 2. FIG. 8 is a cross-sectional perspective view taken along a line I-I' shown in FIG. 1. FIG. 9 is an enlarged view illustrating an A portion shown in FIG. 8.

Referring to FIG. 3, the display 110 is supported by a wall mount 120 to be described later and may be fixed to the wall 140. The display 110 may include a first accommodating portion 114 formed in a rear surface 113 of the display 110.

The first accommodating portion 114 may be recessed in the rear surface 113 to accommodate both the wall mount 120 and the fixing bracket 130 to be described later. When the wall mount 120 is fixed to the fixing bracket 130, the first accommodating portion 114 may be provided in a shape corresponding to the outer shape of the wall mount 120 and the fixing bracket 130.

When the wall mount 120 is fixed to the fixing bracket 130, the first accommodating portion 114 may have a depth corresponding to the combined thicknesses of the wall mount 120 and the fixing bracket 130. Alternatively, the first accommodating portion 114 may have a minimum depth corresponding to the thickness of the fixing bracket 130 that is relatively thin and may have a maximum depth corresponding to the thickness of the wall mount 120 that is relatively thick. That is, the depth of the first accommodating portion 114 may be greater than the thickness of the fixing bracket 130 and less than the thickness of the wall mount 120.

As described above, the display 110 of the display apparatus 1 according to the example embodiment includes the first accommodating portion 114 which may accommodate both the wall mount 120 and the fixing bracket 130 on the rear surface of the display 110 so that it may be brought into close contact with the wall 140 when installed in the wall 140. Accordingly, the display apparatus according to the example embodiment can give the user an impression that the display 110 and the wall 140 are integrated with each other, and thus the appearance can be enhanced and can prevent the rear surface of the display 110 from being exposed to the outside, thereby making the appearance neat.

A wall mount coupling portion 115 to which a coupling protrusion 127 of the wall mount 120 is coupled may be provided inside the first accommodating portion 114. The wall mount coupling portion 115 may have a groove shape. The number of wall mount coupling portions 115 may be provided in accordance with the number of coupling protrusions 127. The user may fix the display 110 to the wall 140 by fixing the display 110 to the wall mount 120 so that the coupling protrusion 127 of the wall mount 120 is inserted into the wall mount coupling portion 115 provided in the first accommodating portion 114 on the rear surface 113 of the display 110. That is, the rear surface 113 of the display 110 except for a portion where the first accommodating portion 114 is formed may be in close contact with the wall 140.

The display 110 may include a first accommodating portion cover 114a that is configured to cover the first accommodating portion 114 when the display 110 is installed on a separate support member without being installed on the wall 140. Accordingly, the display 110 according to the example embodiment is not limited in this use as a wall-mounted type, but can also be used as a stand type.

The display 110 may include a second accommodating portion 116 in which a cable C electrically connecting the display 110 and an external device is accommodated. The second accommodating portion 116 may be recessed in the rear surface 113 of the display 110. The second accommodating portion 116 may be formed to have a depth greater than the thickness of the cable C. That is, the second accommodating portion 116 may be formed to have a minimum depth corresponding to the thickness of the cable C.

Referring to FIG. 4, the second accommodating portion 116 may include a cable guide portion 117 that guides the cable C such that the cable C is drawn out of the display 110 through the bottom surface of the display 110.

The cable guide portion 117 may include a space having a shape corresponding to the shape of the cross section of the cable C and an insertion port 117a through which the cable C may be inserted. With this configuration, the display apparatus 1 according to the example embodiment does not need to have a space for passing the cable C between the display 110 and the wall 140 so that the display 110 can be brought into close contact with the wall 140. In addition, the cable C connected to the display 110 can be easily arranged.

The display 110 may include a second accommodating portion cover 116a that is provided to cover the second accommodating portion 116 when the cable C is not connected to the display 110 and the display 110 is not installed on the wall. Accordingly, the display 110 according to the example embodiment is not limited in this use as a wall mounted type, but may also be used as a stand type.

Referring to FIGS. 5 and 6, the wall mount 120 may be coupled to the display 110 to support the display 110 and may be fixed to the wall 140 by being coupled to a fixing bracket 130 to be described later. The wall mount 120 may include a first member 121, a tilting member 124, and a second member 126.

The first member 121 may include a shaft 122 that is releasably coupled to the fixing bracket 130. The shaft 122 may be provided to be pressable and engageable with a safety device 134 (see FIGS. 7, 9, 11 and 13) when the first member 121 is engaged with the fixing bracket 130. The shaft 122 may be provided to be rotated and press the safety device 134 so as to be detached from the fixing bracket 130 when the first member 121 is detached from the fixing bracket 130.

Figure 11:
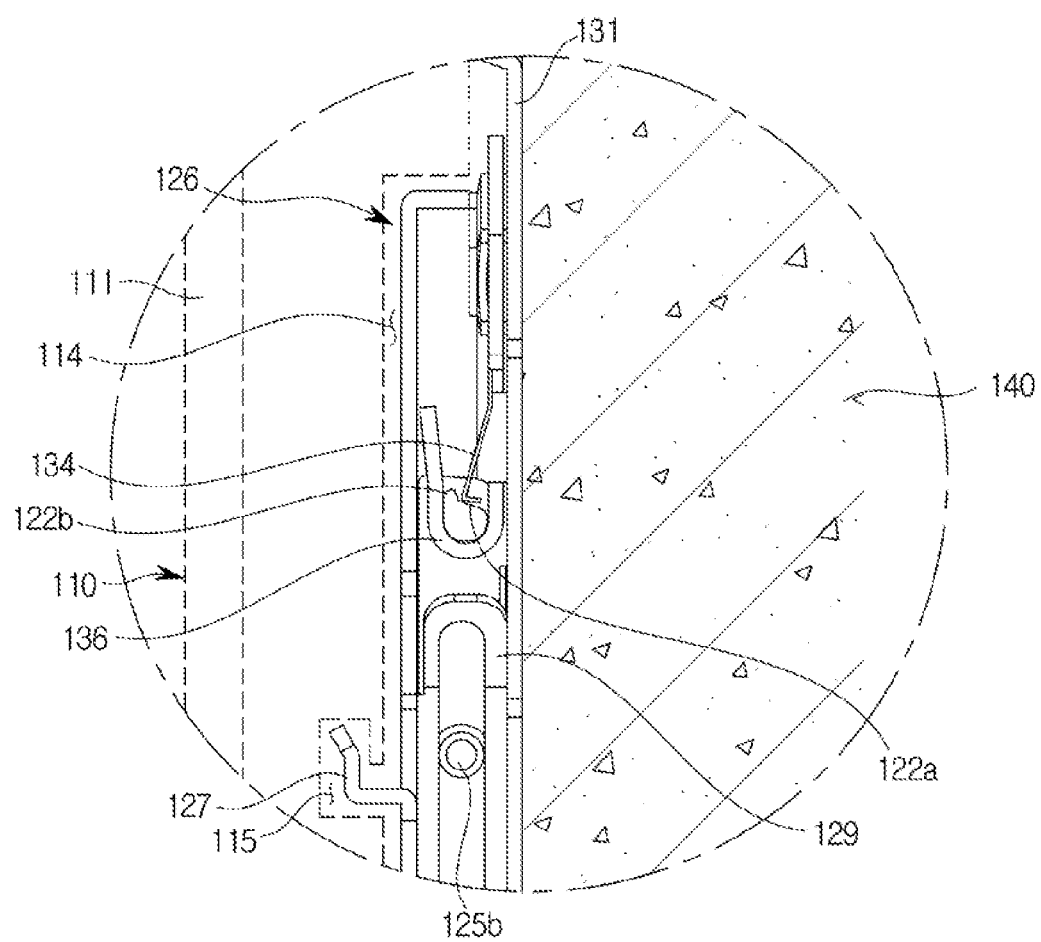
FIG. 11 is an enlarged view illustrating B portion shown in FIG. 10.
Figure 13:
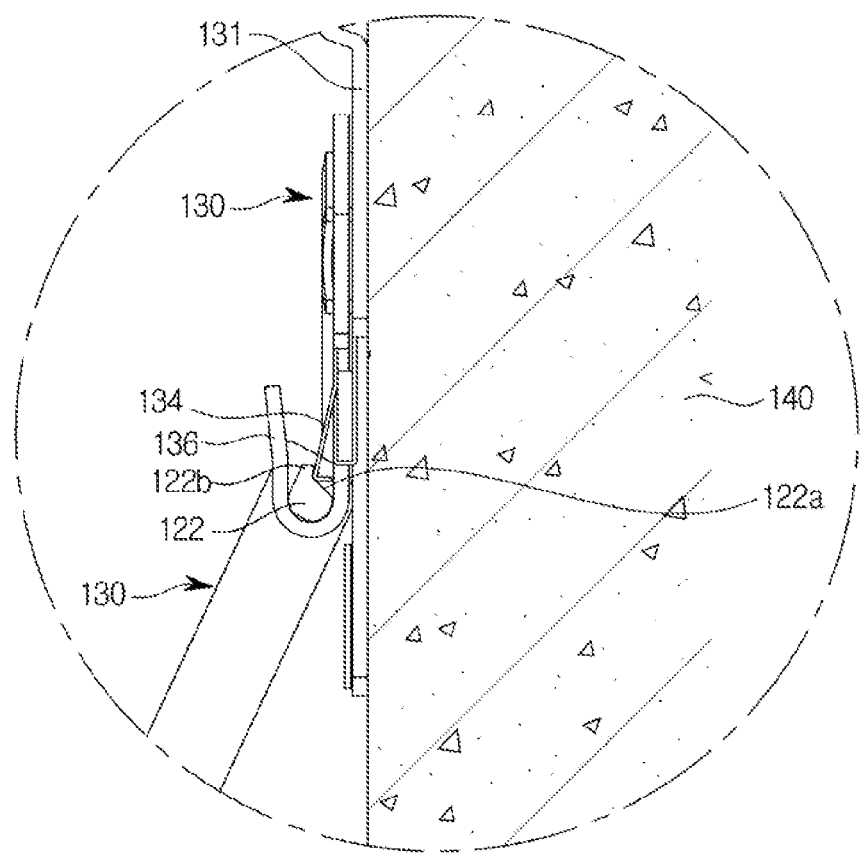
FIG. 13 is an enlarged view illustrating C portion shown in FIG. 12.

Specifically, referring to FIGS. 9, 11 and 13, the shaft 122 may include a fixing portion 122a and pressing portion 122b.

The fixing portion 122a may be pressed by the safety device 134 after the shaft 122 is engaged with a shaft coupling portion 136 of the fixing bracket 130. Accordingly, the wall mount 120 may be firmly fixed to the fixing bracket 130 and may be prevented from being detached from the fixing bracket 130.

The pressing portion 122b may press the safety device 134 when the shaft 122 is separated from the shaft coupling portion 136 of the fixing bracket 130. As the safety device 134 is pressed, a space for moving the shaft 122 in the direction in which the shaft 122 is separated may be formed in the shaft coupling portion 136, and thus the shaft 122 may be separated from the shaft coupling portion 136. That is, as the pressing portion 122b presses the safety device 134, the fixing of the safety device 134 to the shaft 122 may be released.

The first member 121 may include a rotation protrusion 123a that is rotatably coupled to a second rotating portion 128 of the second member 126. The rotation protrusion 123a may be coupled to the second rotating portion 128 to be rotatable with respect to the second rotating portion 128 when a force greater than a predetermined magnitude is applied to the second rotating portion 128. That is, the wall mount 120 of the display apparatus 1 according to the example embodiment may be configured such that the first member 121 is rotated only when a force greater than a predetermined magnitude is applied to the second member 126 when the first member 121 is fixed to the fixing bracket 130.

The first member 121 may include a third rotating portion 123b to which a tilting member 124 is rotatably coupled. Specifically, the third rotating portion 123b may be rotatably coupled to a first rotating portion 125a of the tilting member 124 by a second coupling member 152 and 153.

The tilting member 124 may include the first rotating portion 125a rotatably coupled to the first member 121 and a guide protrusion 125b.

The first rotating portion 125a may be rotatably coupled to the third rotating portion 123b of the first member 121 by the second coupling member 152 and 153, as described above.

The guide protrusion 125b may be provided at an end portion of the tilting member 124 opposite to another end portion of the tilting member 124 provided with the first rotating portion 125a. The guide protrusion 125b may be slidably and/or rollably coupled to a guide slit 129 of the second member 126 which will be described later. That is, the guide slit 129 may guide the movement of the guide protrusion 125b.

The second member 126 may include a coupling protrusion 127 coupled to the wall mount coupling portion 115 provided in the first accommodating portion 114 of the display 110. The coupling protrusion 127 may protrude from one surface of the second member 126 to which the display 110 is coupled. Although two coupling protrusions 127 are provided in the example embodiment shown in FIG. 6, the number of coupling protrusions 127 is not limited thereto. Therefore, one coupling protrusion 127 or more than two coupling protrusions 127 may be provided so that the wall mount 120 can support the display 110 firmly.

The second member 126 may include the second rotating portion 128 to which the rotation protrusion 123a of the first member 121 is rotatably coupled. As described above, the second rotating portion 128 may be slightly fitted-coupled to allow to rotate only when a force greater than a predetermined magnitude is applied to the rotation protrusion 123a.

The second member 126 may include the guide slit 129. The guide slit 129 may extend in the longitudinal direction of the wall mount 120 to guide the movement of the guide protrusion 125b, as described above.

With this configuration, the wall mount 120 may be configured to be set in a close contact mode to move the display 110 in close contact with the wall 140 or a tilting mode to move the display 110 to tilt to the wall 140.

The fixing bracket 130 may be fixed to the wall 140. Referring to FIG. 7, the fixing bracket 130 may include a first bracket 131 and a second bracket 133.

The first bracket 131 may be fixed to the wall by a first fixing member 151. The first bracket 131 may include a first coupling hole 132 to which the first fixing member 151 is coupled. In addition, the first fixing member 151 may be fixed to the first coupling hole 132 in a state where a first washer 154 is coupled to the first fixing member 151.

The second bracket 133 may be fixed to the first bracket 131 by a second fixing member 155. The second bracket 133 may be fixed to the wall 140 as a third fixing member 156 is coupled to the second coupling hole 135. The second bracket 133 may include the safety device 134 and the shaft coupling portion 136. At this time, a second washer 157 may be coupled to the third fixing member 156.

The safety device 134 may have an elastic force and may be provided such that the position is changed when the shaft 122 is inserted into the shaft coupling portion 136 or separated from the shaft coupling portion 136. Specifically, the safety device 134 may be pressed by the shaft 122 when the shaft 122 is coupled to the shaft coupling portion 136 so that the safety device 134 may form a space through which the shaft 122 is inserted into the shaft coupling portion 136. The safety device 134 may be pressed by the shaft 122 when the shaft is separated from the shaft coupling portion 136 so that the safety device 134 may form a space through which the shaft 122 is separated from the shaft coupling portion 136.

The safety device 134 may be provided to press the fixing portion 122a when the shaft 122 is inserted into the shaft coupling portion 136 and to be pressed by the pressing portion 122b when the shaft 122 is separated from the shaft coupling portion 136. As the safety device 134 is pressed by the pressing portion 122b, the safety device 134 becomes able to release the fixation to the shaft 122.

The shaft coupling portion 136 may be mounted on the shaft 122 to fix the wall mount 120 to the fixing bracket 130. The shaft coupling portion 136 may be provided in a shape corresponding to the shape of the shaft 122.

According to the example embodiment, with this configuration, the display apparatus can easily fix the wall mount 120 to which the display 110 is fixed to the fixing bracket 130 fixed to the wall 140 or can easily detach the wall mount 120 from the fixing bracket 130.

Figure 10:
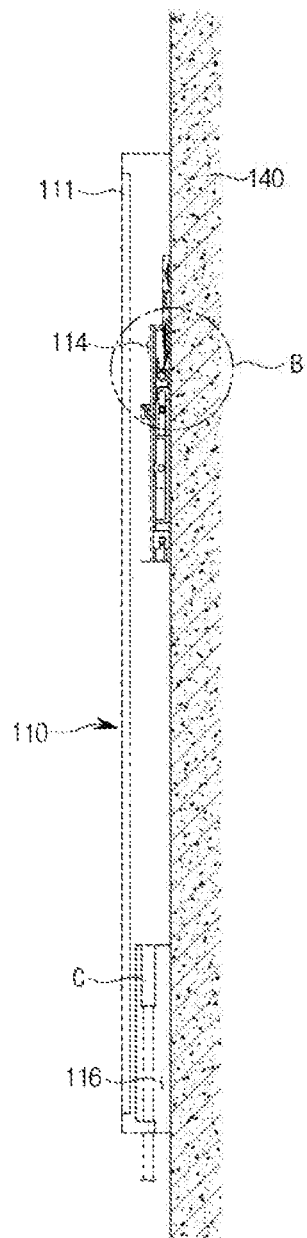
FIG. 10 is a cross-sectional view illustrating the display of the display apparatus shown in FIG. 1 being closely attached to the wall.
Figure 12:
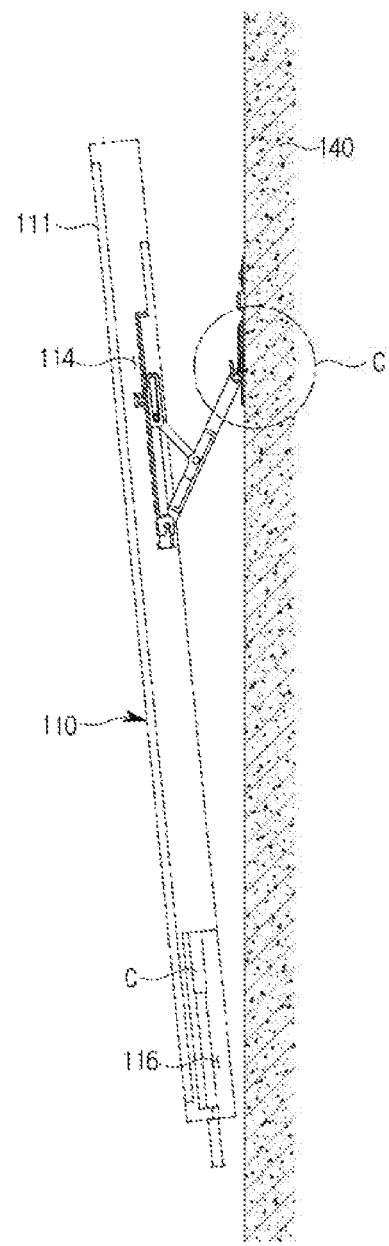
FIG. 12 is a cross-sectional view illustrating a state in which the display of the display apparatus shown in FIG. 1 is tilted with respect to the wall.

FIG. 10 is a cross-sectional view illustrating the display of the display apparatus shown in FIG. 1 being closely attached to the wall. FIG. 11 is an enlarged view illustrating a B portion shown in FIG. 10. FIG. 12 is a cross-sectional view illustrating a state in which the display of the display apparatus shown in FIG. 1 is tilted with respect to the wall. FIG. 13 is an enlarged view illustrating a C portion shown in FIG. 12.

Referring to FIGS. 10 and 11, when the wall mount 120 is set in the close contact mode, the wall mount 120 is positioned such that the first member 121, the second member 126, and the tilting member 124 are substantially in the same plane, and the wall mount 120 and the fixing bracket 130 are accommodated in the first accommodating portion 114. In addition, the cable C may be accommodated in the second accommodating portion 116.

At this time, the safety device 134 may press the fixing portion 122a of the shaft 122 so that the display 110 fixed to the wall mount 120 may be securely fixed to the wall 140. Also, the coupling protrusion 127 may be inserted into the wall mount coupling portion 115.

Accordingly, the display 110 may be brought into close contact with the wall 140. Therefore, the display apparatus 1 according to the example embodiment may provide the user with an impression that the display apparatus 1 is integrated with the wall 140 and may prevent the rear surface of the display 110 from being exposed to the outside.

Referring to FIGS. 12 and 13, the wall mount 120 may be set in the tilting mode so that the display 110 may be tilted with respect to the wall 140. At this time, the guide protrusion 125b may move within the guide slit 129 and the rotation protrusion 123a may rotate relative to the second rotating portion 128 and the first rotating portion 125a may rotate with respect to the third rotating portion 123b. Accordingly, the second member 126 may be tilted with respect to the first member 121.

In addition, when the shaft 122 further rotates, the safety device 134 may be pressed by the pressing portion 122b of the shaft 122 and form a space through which the shaft 122 may be separated from the shaft coupling portion 136. Accordingly, the wall mount 120 may be detached from the fixing bracket 130, thereby detaching the display 110 from the wall 140.

According to the present disclosure, the display apparatus is provided on the rear surface of the display with a first accommodating portion which can receive the wall mount and the fixing bracket so that the display can be brought into close contact with the wall when the display is fixed to the wall by the wall mount.

According to the present disclosure, the display apparatus has a second accommodating portion provided at the rear surface of the display to receive the cable so that the display can be brought into close contact with the wall when the display is connected to the cable.

According to the present disclosure, the display apparatus can prevent the rear surface of the display from being exposed to the outside and can give the user an impression of the display being integrated with the wall, so that the appearance can be enhanced because the display can be brought into close contact with the wall.

According to the present disclosure, the display apparatus includes a safety device capable of selectively fixing the wall mount to the fixing bracket, so that the display can be stably fixed to the wall and easily separated from the wall.

Although a few example embodiments have been shown and described, it would be appreciated by those skilled in the art that changes may be made in these example embodiments without departing from the principles and spirit of the disclosure, the scope of which is defined in the claims and their equivalents.

What is claimed is:

1. A wall mount assembly comprising:
a fixing bracket fixed, in use, to a wall; and
a wall mount coupled to the fixing bracket and configured to be set in a close contact mode in which the wall mount is adjacent to the wall and to be set in a tilting mode in which the wall mount is tilted with respect to the wall,
wherein the wall mount comprises:
a first member comprising a shaft detachably coupled to the fixing bracket;
a tilting member comprising a first rotating portion rotatably coupled to the first member; and
a second member comprising a second rotating portion rotatably coupled to the first member and a guide slit guiding movement of one end portion of the tilting member;
wherein the wall mount is configured to be detachable from the fixing bracket by rotating the first member relative to the fixing bracket.

2. The wall mount assembly of claim 1, wherein the tilting member comprises a guide protrusion protruding to be guided by the guide slit by being inserted into the guide slit.

3. The wall mount assembly of claim 2, wherein the guide protrusion is slidable or rollable on the guide slit.

4. The wall mount assembly of claim 1, wherein the fixing bracket comprises a shaft coupling portion to which the shaft is coupled, and
the shaft coupling portion comprises a safety device configured to selectively secure the shaft such that the shaft is selectively detached from the shaft coupling portion.

5. The wall mount assembly of claim 4, wherein the shaft comprises
a fixing portion pressed by the safety device so that the wall mount is fixed to the fixing bracket when the wall mount is coupled with the fixing bracket; and
a pressing portion configured to press the safety device so that fixing of the safety device to the shaft is released when the wall mount is detached from the fixing bracket.

6. The wall mount assembly of claim 4, wherein the wall mount is configured to be released from the safety device as the shaft rotates.

7. The wall mount assembly of claim 1, wherein the first member comprises a rotating protrusion rotatably coupled to the second rotating portion, and
the rotating protrusion is coupled to the second rotating portion to be rotatable with respect to the second member when a force greater than a predetermined magnitude is applied to the second rotating portion.

* * * * *